United States Patent [19]

Nagano

[11] Patent Number: 4,670,000
[45] Date of Patent: Jun. 2, 1987

[54] SUPPORT STRUCTURE FOR A CHAIN GUIDE AT A DERAILLEUR FOR A BICYCLE

[75] Inventor: Masashi Nagano, Izumi, Japan

[73] Assignee: Shimano Industrial Company Limited, Osaka, Japan

[21] Appl. No.: 882,509

[22] Filed: Jul. 7, 1986

[30] Foreign Application Priority Data

Jul. 16, 1985 [JP] Japan .............................. 60-109297[U]

[51] Int. Cl.$^4$ ............................................. F16H 9/06
[52] U.S. Cl. ...................................................... 474/80
[58] Field of Search ................................... 474/78–80, 474/82

[56] References Cited

U.S. PATENT DOCUMENTS 4,323,357  4/1982  Nagano ................................. 474/82
4,406,643  9/1983  Shimano ................................ 474/80

FOREIGN PATENT DOCUMENTS 58-57346  12/1983  Japan .

Primary Examiner—Stephen J. Novosad
Assistant Examiner—Thuy M. Bui
Attorney, Agent, or Firm—Stevens, Davis, Miller & Mosher

[57] ABSTRACT

A support structure for supporting a chain guide to a movable member of a bicycle derailleur. The support structure includes a support shaft and a locking member which swingably supports the chain guide to the movable member and prevents it from coming loose therefrom. The movable member is provided with a cylindrical portion having a bottom wall with a shaft bore and also having a cover member which is integral with the movable member. The cover member has a cavity formed outwardly of the bottom wall. The cavity receives the utmost end of the support shaft projecting from the bottom wall. The cover member has an insertion bore through which the locking member is inserted to engage with a retaining groove of the support shaft.

9 Claims, 5 Drawing Figures

SUPPORT STRUCTURE FOR A CHAIN GUIDE AT A DERAILLEUR FOR A BICYCLE

FIELD OF THE INVENTION

This invention relates to a support structure for a chain guide at a derailleur for a bicycle, and more particularly, to a support structure for swingably supporting to a movable member at the bicycle derailleur a chain guide which guides a driving chain from one sprocket to another of a multistage sprocket assembly.

BACKGROUND OF THE INVENTION

A conventional bicycle derailleur, as disclosed in, for example, the Japanese Patent Publication Gazette No. Sho 58-57,346, is provided with a base member and a movable member supported with respect thereto to be movable axially of the multistage sprocket assembly. The movable member is provided with a shaft bore and supports swingably through a support shaft inserted into the shaft bore a chain guide having a guide sprocket and a tension sprocket. The chain guide is mounted on the movable member such that it cannot escape therefrom, through a snap ring retained to one end of the support shaft projecting from the shaft bore. The support shaft is covered with a cap at its utmost end which projects from the shaft bore.

Such conventional derailleur needs the cap, resulting in that the number of parts increases and the assembly efficiency decreases because of the need to fit the cap onto the support shaft from the exterior. The use of the cap restricts the design of the movable member to lower the degree of freedom thereof and also the cap may come loose and fall off to be lost when the derailleur is marketed.

SUMMARY OF THE INVENTION

An object of the present invention is to provide a support structure for a chain guide at the bicycle derailleur, which (1) eliminates the conventional cap, and in turn the cap-fitting assembly work, so as to reduce the number of parts and simplify the assembly procedure (2) covers the projection of the support shaft projecting from the movable member so as to solve the problem of rust caused by exposure to rain water, and (3) uses a locking member, such as a snap ring, the same as in the conventional derailleur so as to support the chain guide to the movable member to prevent the chain guide from escaping therefrom.

The present invention is constructed such that the movable member at the derailleur for the bicycle is provided with a cylindrical portion having a bottom wall with a shaft bore through which a support shaft projecting from the chain guide is pivotally supported and a cover member which is provided with a cavity for receiving therein the utmost end of the support shaft pivoted into the shaft bore. The cover member covers the utmost end of the support shaft and is integral with the movable member. The cover member is provided with an insertion bore connecting the cavity with the exterior. A locking member is inserted into the insertion bore and is engageable with an annular retaining groove at the utmost end of the support shaft to retain the support shaft to the bottom wall. The chain guide is supported to the movable member such that the support shaft is inserted into the cylindrical portion from an open side of the cylindrical portion and is pivotally supported within the shaft bore at the bottom wall of the cylindrical portion. The locking member is inserted through the insertion bore to engage with the retaining groove at the support shaft. Hence, the chain guide is supported swingably to the movable member through the support shaft and the support shaft is covered at the utmost end thereof with the cover member, thereby improving the appearance of the movable member and inhibiting rust because the utmost end of the support shaft is covered to prevent exposure to rain water.

Furthermore, the locking member can be easily inserted into the movable member through the insertion bore to engage with the retaining groove, thereby supporting the chain guide to the movable member without the risk of its escaping therefrom.

In the present invention, there is no need to fit a separate cap member onto the utmost end of the support shaft as in conventional derailleurs, thereby enabling the cap to be omitted with a corresponding reduction in the number of parts. Also, since the cap is not used, the movable member is not restricted in design, thereby raising the degree of freedom thereof to that extent. Furthermore, the assembly work efficiency is higher than when the cap is used and manufacturing costs are low.

Also, in the present invention, a jig insertion bore through which the cavity at the cover member communicates with the exterior is provided at a side of the cover member opposite to the location of the aforesaid insertion bore for the locking member. A jig is inserted through the jig insertion bore to disengage the locking member with ease from the retaining groove at the support shaft, thereby enabling the chain guide to be disconnected from the movable member.

Furthermore, the insertion bore for the locking member is level with the outer surface of the bottom wall of the cylindrical portion, and a position setting means is provided which sets the retaining groove of the support shaft level with the outer surface of the same when the support shaft is fitted into the shaft bore at the bottom wall. As a result, when the locking member is inserted into the cavity of cover member through the locking member insertion bore and engages with the retaining groove, the outer surface of the bottom wall serves as a guide surface through which the locking member engages easily with the retaining groove by merely inserting the locking member into the cover member.

In addition, the retaining groove at the support shaft is provided with slopes for guiding the locking member, thereby enabling smooth and reliable engagement thereof with the retaining groove.

Other objects and aspects of the invention will become apparent from the following description of the embodiment with reference to the accompanying drawings.

DETAILED DESCRIPTION OF THE INVENTION

Figure 4:
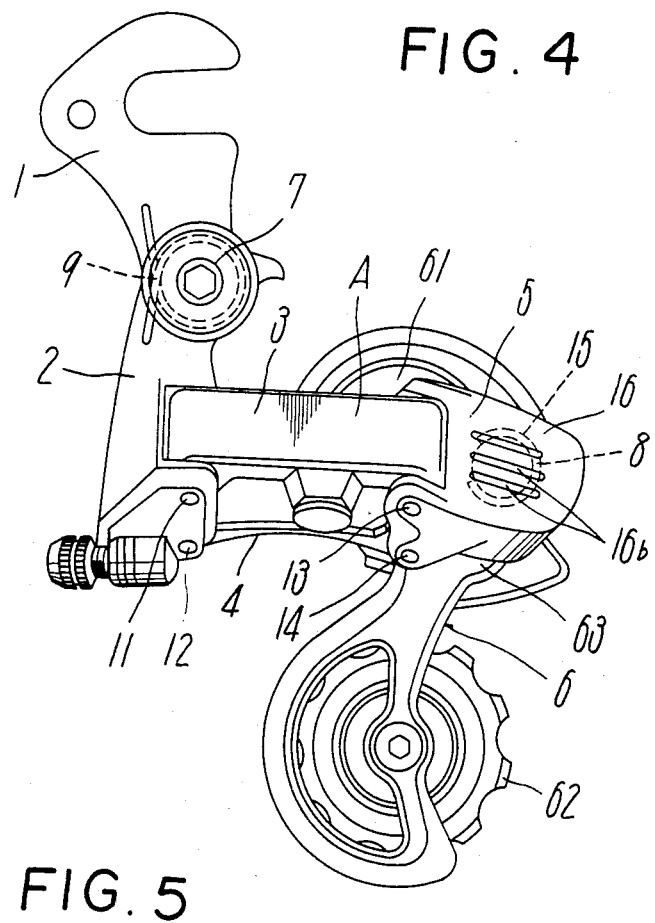
FIG. 4 is a front view of the entire derailleur for the bicycle, including the support structure of the invention.
Figure 5:
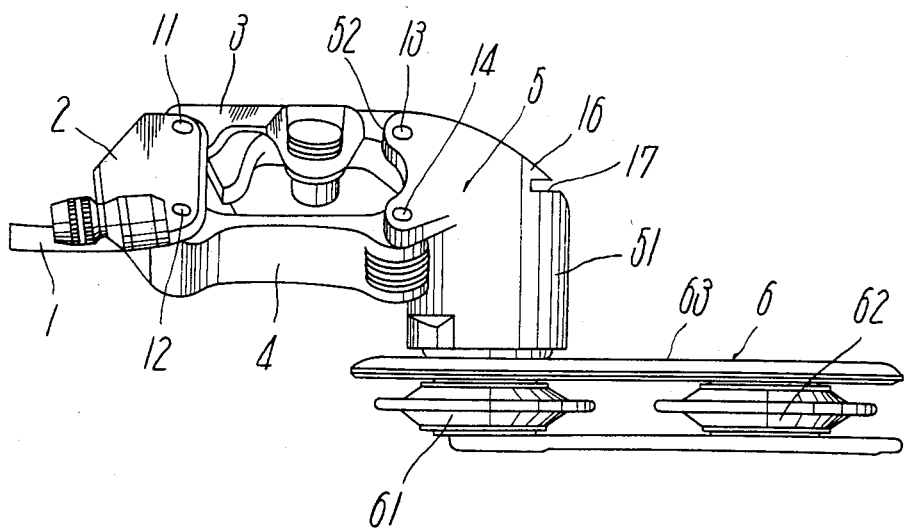
FIG. 5 is a bottom view of the derailleur in FIG. 4.

A bicycle derailleur, which applies the support structure for a chain guide of the present invention, comprises a fixing member 1 fixed together with a hub shaft to the bicycle frame; a linkage mechanism A comprising a base member 2, a pair of linkage members 3 and 4 and a movable member 5; and a chain guide 6 including a guide sprocket 61, a tension sprocket 62 and a support plate 63 as shown in, for example, FIGS. 4 and 5. The base member 2 is supported swingably to the fixing member 1 through a pivot shaft 7, and the chain guide 6 is supported swingably to the movable member 5 through a support shaft 8. A first spring 9 is provided between the fixing member 1 and the linkage mechanism A, and a second spring 10 is provided between the movable member 5 and the chain guide 6, so that the first and second springs 9 and 10 balance with each other to set the radial position of the guide sprocket 61 with respect to one of rear chain gears.

The base member 2 at the linkage mechanism A comprises a boss for supporting the pivot shaft 7 and support portions projecting outwardly from the boss to pivotally support respective ends of the linkage members 3 and 4 through a pair of pins 11 and 12, so that the linkage members 3 and 4 pivotally support at their free ends the movable member 5 through a pair of pins 13 and 14.

The support structure of the present invention is used to support the chain guie 6 swingably to the movable member 5 through the support shaft 8, and is constructed as described below.

Figure 1:
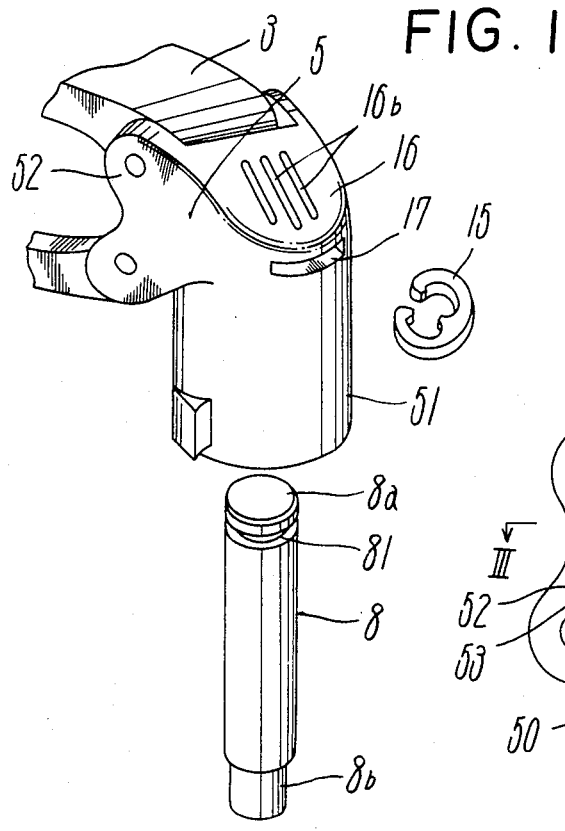
FIG. 1 is a perspective exploded view of a movable member and a support shaft of a bicycle derailleur, including an embodiment of a support structure according to the invention.
Figure 2:
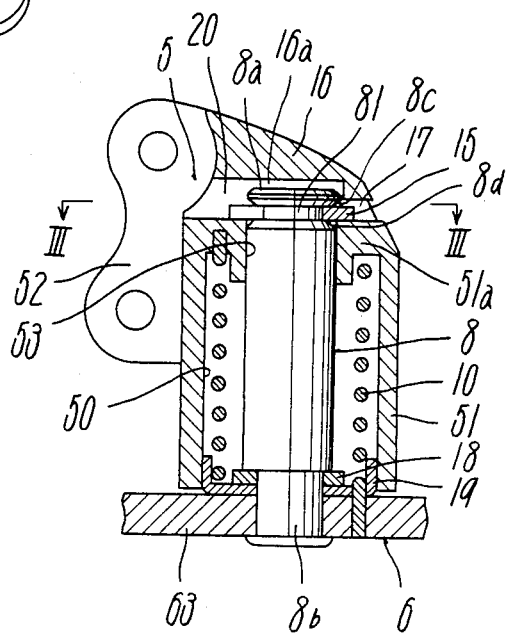
FIG. 2 is a sectional view of the movable member supporting a chain guide.

The movable member 5 is provided with a pair of supports 52 connecting with the linkage members 3 and 4 through the pins 13 and 14 respectively, and with a cylindrical portion 51 having the bottom wall 51a as shown in FIGS. 1 and 2.

The cylindrical portion 51 has an inner diameter larger than an outer diameter of the support shaft 8 and is open at one axial end (the lower end in FIGS. 1 and 2) toward the chain guide 6, and at the center of the bottom wall 51a is formed a shaft bore 53 into which the support shaft 8 is pivotably supported.

The support shaft 8 projects from the support plate 63 at the chain guide 6 and has at the utmost end portion 8a an annular retaining groove 81.

When the support shaft 8 is inserted into the cylindrical portion 51 and pivotally supported at the utmost end into the shaft bore 53, the retaining groove 81 at the support shaft 8 is adapted to come out upwardly, as shown in FIG. 2, from the outer surface of the bottom wall 51a.

The position of the retaining groove 81 with respect to the bottom wall 51a is set in consideration of an axial length of the support shaft 8 and that of the cylindrical portion 51 from the open end thereof to the outer surface of the bottom wall 51a. However, the support shaft 8 actually has a smaller diameter shaft 8b through a shoulder as shown in FIG. 2. When the smaller diameter shaft 8b is calked to the support plate 63 at the chain guide 6, a spacer 18 and a cup-like holder 19 fitted to the inner periphery of the open end of the cylindrical portion 51 are interposed between the shoulder at the support shaft 8 and the support plate 63 at the chain guide 6, thereby setting by the spacer 18 a length of support shaft 8 projecting from the support plate 63, and in turn the position of the retaining groove 81 with respect to the bottom wall 51a. In this case, the spacer 18 constitutes the position setting means for the retaining groove 81 with respect to the bottom wall 51a, the holder 19 being supported at its flange to the cylindrical portion 51.

In the movable member 5 constructed as described above, a cover member 16 is formed at the axially outside of the support shaft 8 with respect to the bottom wall 51a. Cover member 16 has a cavity for receiving therein the utmost end 8a of the support shaft 8 inserted into the shaft bore 53 at the bottom wall 51a and projecting outwardly therefrom. Cover member 16 is integral with the movable member 5 and covers the utmost end 8a of the support shaft 8. Also, the cover member 16 is provided with an insertion bore 17 through which the cavity 16a communicates with the exterior and a locking member 15 engageable with the retaining groove 81 is insertable into insertion bore 17.

Figure 3:
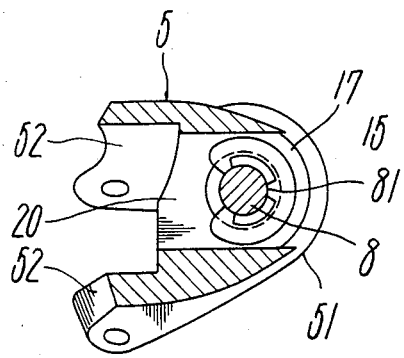
FIG. 3 is a sectional view taken on the line III—III in FIG. 2, from which the chain guide is omitted.

The locking member 15, as shown in FIGS. 1 and 3, preferably is an E-ring or a C-ring (not shown) and engages with the retaining groove 81 to retain the support shaft 8 to the bottom wall 51a, thereby preventing the chain guide 6 from falling off from the movable member 5.

The movable member 5 and cover portion 16 are integrally formed preferably of synthetic resin and the insertion bore 17 is formed when the movable member 5 is molded. The insertion bore 17, as shown in FIG. 3, has a larger diameter than an outer diameter of the locking member 15 and is level with the outer surface of the bottom wall 51a as shown in FIG. 2. Thus, the retaining groove 81 at the support shaft 8 inserted into the shaft bore 53 is level with the outer surface of the bottom wall 51a and also the outer surface thereof serves as a guide slope for the locking member 15 to be inserted into the insertion bore 17, whereby the locking member 15 can simply and reliably engage with the retaining groove 81.

The cover member 16 is open to the exterior of the opposite side to the insertion bore 17 as shown in FIG. 3, thereby forming a jig insertion bore 20 through which a jig is inserted to push out the locking member 15 in engagement with the retaining groove 81.

Thus, the locking member 15 engages with the retaining groove 81 to support the chain guide 6 to the movable member 5, and thereafter the jig is inserted through the jig insertion bore 20 to push out the locking member 15 through the insertion bore 17, thereby enabling the chain guide 6 to be dismounted from the movable member 5.

Also, at the upper and lower surfaces at the retaining groove 81 are provided slopes 8c and 8d as shown in FIG. 2, thereby facilitating engagement of the locking member 15 with the retaining groove 81. The cover member 16 is provided at the surface with a pattern 16b of stripes of recesses as shown in FIG. 1.

Next, explanation will be given on the procedure of supporting the chain guide 6 to the movable member 5 by use of the above support structure.

At first, the support shaft 8 projecting from the chain guide 6 is inserted into the cylindrical portion 51, and thereafter the utmost end 8a of the support shaft 8 is inserted into the shaft bore 53 at the bottom wall 51a so as to enter into the cavity 16a at the cover member 16.

At this time, the retaining groove 81 is level with the outer surface of the bottom wall 51a. In such condition, the locking member 15 is inserted into the cavity through the insertion bore 17 and guided by a slope at the outer surface of the bottom wall 51 and then engages with the retaining groove 81 easily through the slopes thereof, thereby retaining the support shaft 8 to the bottom wall 51a and supporting the chain guide 6 to the movable member 5 such that it is disengageable therefrom and swingable relative thereto.

As seen from the above, the present invention can eliminate the conventional cap thus reducing the number of parts to that extent and improving the degree of freedom in design of the movable member because of lack of design restrictions imposed by the cap.

Accordingly, the movable member 5 can be designed to have a desired simple appearance and can have the pattern 16b of stripes or recesses to enhance its aesthetic appearance.

Moreover, a simple operation of fitting the support shaft 8 into the shaft bore 53 and inserting the locking member 15 into the insertion bore 17 to be retained to the support shaft 8, can support the support shaft 8 to the movable member 5 to prevent it from escaping therefrom, thereby improving the working or assembly efficiency and omitting the cap so as to lower manufacturing costs.

While an embodiment of the invention has been shown and described, the invention is not limited to the specific construction thereof, which is merely exemplary in the specification rather than defined.

What is claimed is:

1. A derailleur for a bicycle, comprising:
   (a) a movable member;
   (b) a chain guide supported to said movable member;
   (c) a support shaft projecting from one side of said chain guide and having at its end remote from said chain guide an annular retaining groove;
   (d) said movable member comprising a hollow cylindrical portion, a portion of said support shaft being disposed within said cylindrical portion and being substantially coaxial therewith, said cylindrical portion having
      (i) an inner diameter larger than an outer diameter of said support shaft;
      (ii) an open axial end adjacent said chain guide, said support shaft passing through said open end into said cylindrical portion; and
      (iii) a closed end having a wall with a shaft bore receiving said end of said support shaft remote from said chain guide such that said end of said support shaft projects outwardly from said wall, said support shaft being pivotably supported relative to said shaft bore;
   (e) a cover member for said end of said support shaft remote from said chain guide, said cover member being positioned axially outwardly relative to and spaced apart from said end of said support shaft and from said wall of said cylindrical portion, and including
      (i) a cavity in which said end of said support shaft is disposed; and
      (ii) a locking member insertion bore connecting said cavity to the exterior; and
   (f) a locking member to be inserted into said insertion bore and engageable with said annular retaining groove to retain said support shaft to said wall of said cylindrical portion.

2. A derailleur for a bicycle according to claim 1, wherein said cover member is provided with a jig insertion bore through which said cavity is open outwardly at a side of said cover member opposite to a side thereof at which said locking member insertion bore is disposed, whereby a jig can be inserted in said jig insertion bore to push said locking member out of said locking insertion bore and out of engagement with said annular retaining groove of said support shaft.

3. A derailleur for a bicycle according to claim 1, wherein said locking member insertion bore is level with an outer surface of said wall facing said cavity, and a position setting means is provided which, when said support shaft is inserted into said shaft bore of said wall, puts said annular retaining groove level with the outer surface of said bottom wall facing said cavity.

4. A derailleur for a bicycle according to claim 1, wherein said support shaft is provided with a sloping portion for guiding said locking member to said annular retaining groove.

5. A derailleur for a bicycle according to claim 3, wherein said position setting means comprises a spacer.

6. A derailleur for a bicycle, comprising:
   (a) a movable member;
   (b) a chain guide supported to said movable member;
   (c) a support shaft projecting from one side of said chain guide and having at its end remote from said chain guide an annular retaining groove;
   (d) said movable member comprising a hollow cylindrical portion, a portion of said support shaft being disposed within said cylindrical portion and being substantially coaxial therewith, said cylindrical portion having (i) a first end adjacent said chain guide, said support shaft passing through said first end into said cylindrical portion, and (ii) a second end having a wall with a shaft bore through which said end of said support shaft remote from said chain guide projects;
   (e) a cover member integral with said movable member, said cover member including a cavity positioned axially outwardly relative to said wall of said cylindrical portion and receiving said end of said support shaft, said cover member including an insertion bore; and
   (f) a locking member for insertion into said insertion bore to engage with said annular retaining groove of said support shaft to retain said support shaft to said wall of said cylindrical portion.

7. A derailleur for a bicycle according to claim 6, wherein said support shaft includes a sloping portion for guiding said locking member to said annular retaining groove.

8. A derailleur for a bicycle according to claim 6, wherein said cover member includes a jig insertion bore connecting said cavity to the exterior, said jig insertion bore being disposed at a side of said cover member opposite to a side thereof at which said locking member insertion bore is disposed, whereby a jig can be inserted in said jig insertion bore to push said locking member out of said locking insertion bore and out of engagement with said annular retaining groove of said support shaft.

9. A derailleur for a bicycle according to claim 6, wherein said locking insertion bore is level with an outer surface of said wall facing said cavity, such that when said support shaft is fully inserted into said shaft bore of said wall, said annular retaining groove is level with said outer surface of said bottom wall facing said cavity.

* * * * *